Nov. 10, 1931.   D. C. SHEARER   1,831,144
MEANS FOR MOLDING COMMUTATOR BRUSHES
Filed May 11, 1929    8 Sheets-Sheet 1

Inventor
Dall C. Shearer
By Spencer Hardman & Zehr
His Attorneys

Nov. 10, 1931.  D. C. SHEARER  1,831,144
MEANS FOR MOLDING COMMUTATOR BRUSHES
Filed May 11, 1929  8 Sheets-Sheet 2

Inventor
Dall C. Shearer
By Spencer Hardman & Fehr
His Attorneys

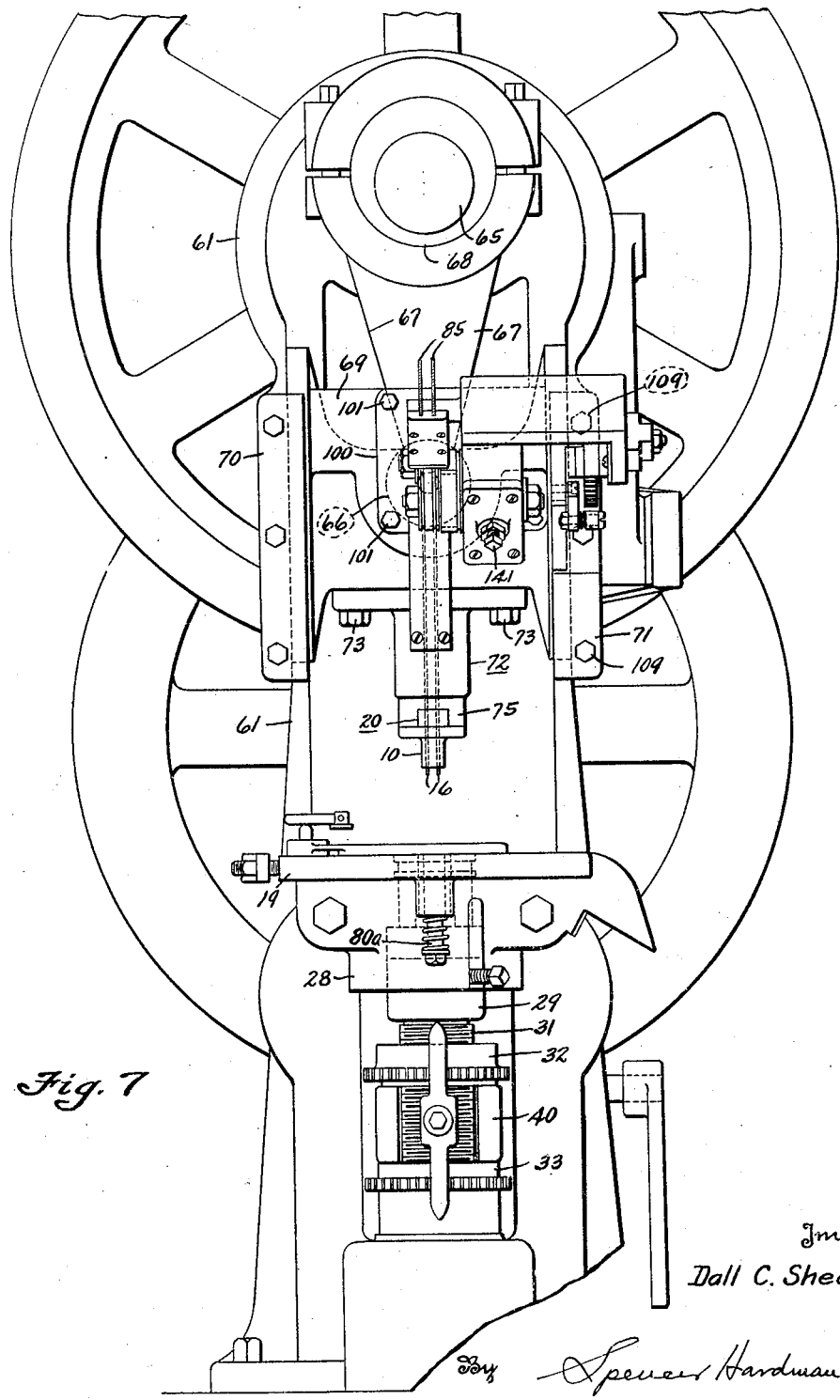

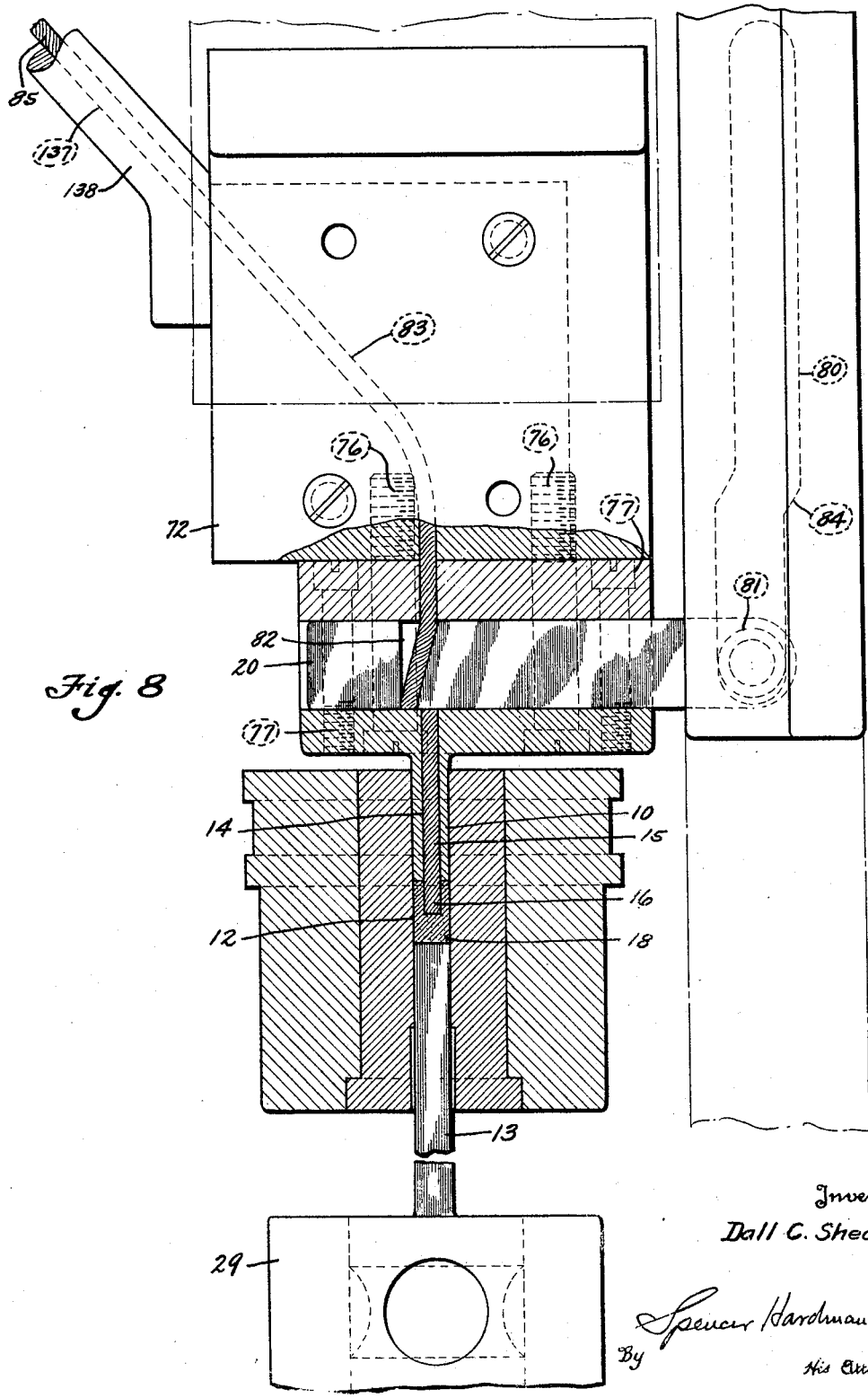

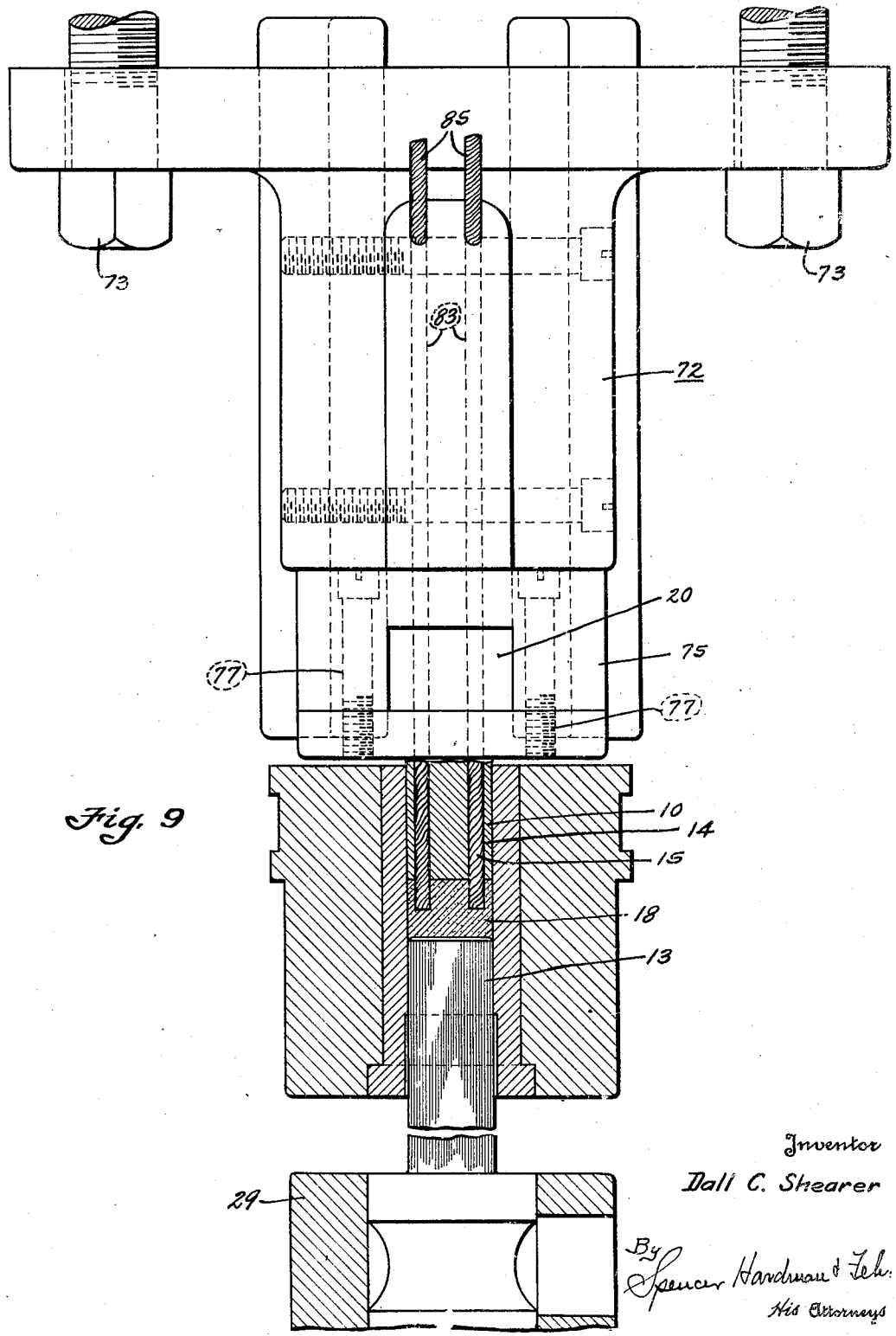

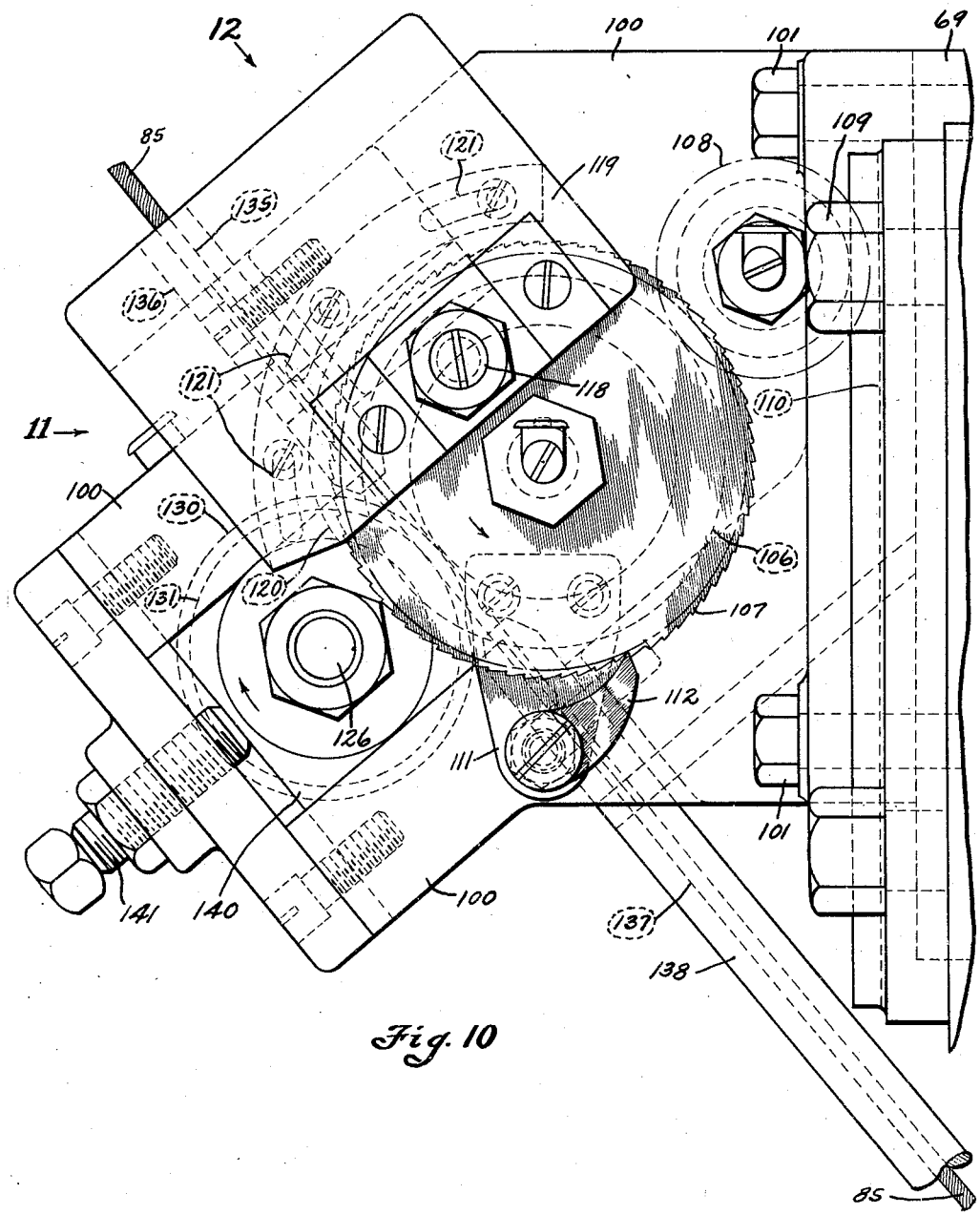

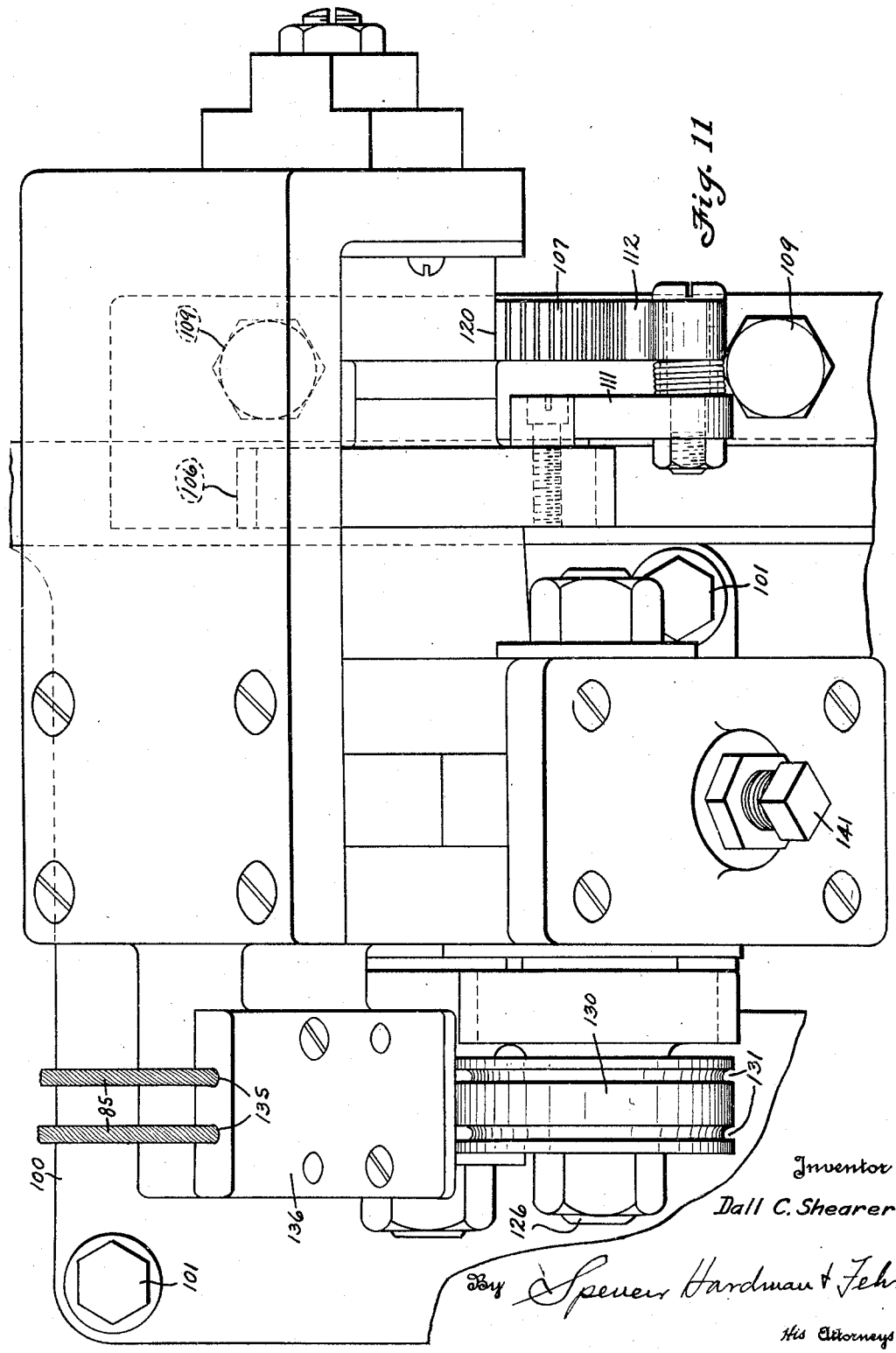

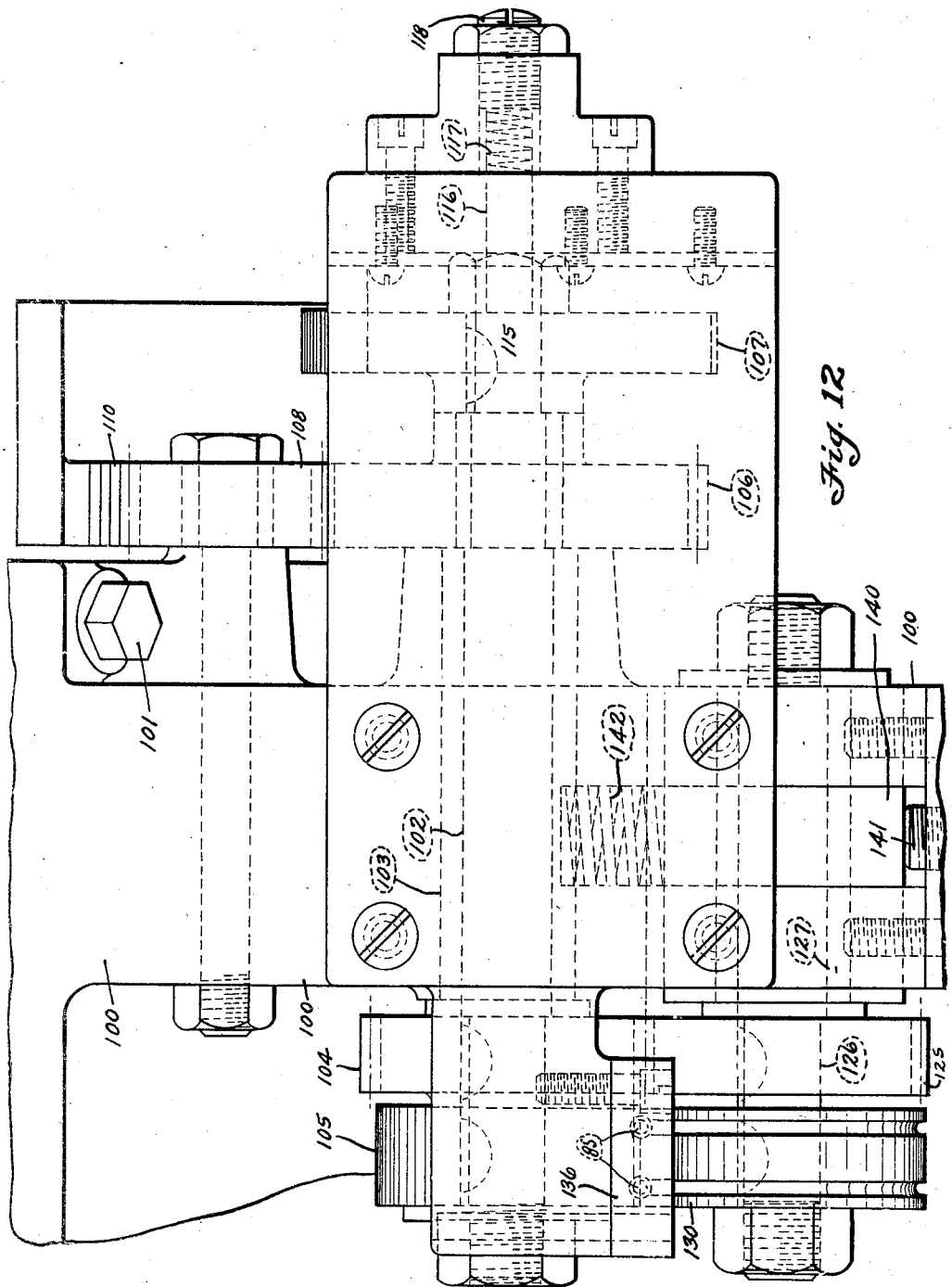

Patented Nov. 10, 1931

1,831,144

UNITED STATES PATENT OFFICE

DALL C. SHEARER, OF DAYTON, OHIO, ASSIGNOR TO DELCO-REMY CORPORATION, OF ANDERSON, INDIANA, A CORPORATION OF DELAWARE

MEANS FOR MOLDING COMMUTATOR BRUSHES

Application filed May 11, 1929. Serial No. 362,172.

This invention relates to molding or briquetting machines, and the like, wherein the resulting molded article has a wire partially embedded therein.

An object of this invention is to provide a briquetting machine for briquetting commutator brushes and the like from a briquettable material and simultaneously partially embed a short length of wire within the briquetted brush or similar article.

A more specific object is to provide such a machine having automatic means for cutting off the required short lengths of wire from a relatively long wire and having automatic means for partially embedding such short wires within the formed articles.

Further objects and advantages of the present invention will be apparent from the following description, reference being had to the accompanying drawings, wherein a preferred form of embodiment of the present invention is clearly shown.

In the drawings:

Figs. 1, 2, 3, and 4 are detail views illustrating the operation of the forming plunger supporting the short lengths of wire and the ejecting punch for removing the briquetted commutator brush from the die cavity. Fig. 1 shows the die cavity loosely filled with the briquettable material and the forming plunger at the top of its stroke. Fig. 2 shows the forming plunger moving down and compressing the material. Fig. 3 shows the forming plunger at the bottom of its stroke after the upper ends of the wires have been cut off. Fig. 4 shows the briquetted brush fully ejected from the die cavity by the lower ejecting punch.

Fig. 7 is a front elevation of the machine of Fig. 6.

Fig. 8 is a detail view showing how the wire severing mechanism cuts off the required short length of wire during the down stroke of the forming plunger and thereafter backs up the upper end of the short wire to withstand the upward force exerted upon the wire by the highly compressed material.

Fig. 9 is a front view of Fig. 8, the forming plunger in both Figs. 8 and 9 being shown at the bottom of its stroke.

Fig. 10 is a side view on a larger scale than shown in Fig. 6 of the wire feeding mechanism which feeds the wire down through the forming plunger only when said plunger is on its up stroke.

Fig. 11 is a front view of the wire feeding mechanism of Fig. 10 looking in the direction of arrow 11 of Fig. 10.

Fig. 12 is a view of the wire feeding mechanism looking in the direction of arrow 12 of Fig. 10.

Similar reference characters refer to similar parts throughout the several views.

Figure 1:
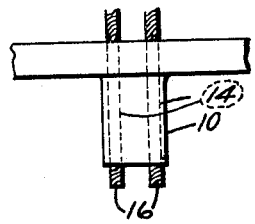
Figure 1:
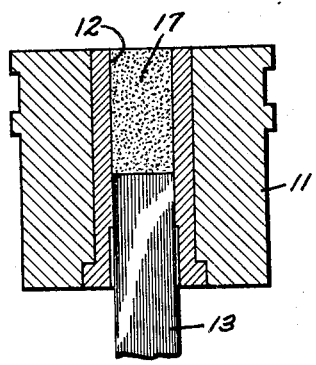
Figure 3:
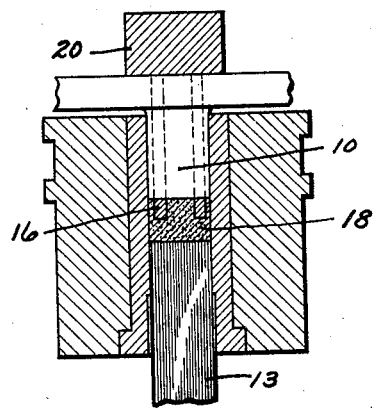
Figure 2:
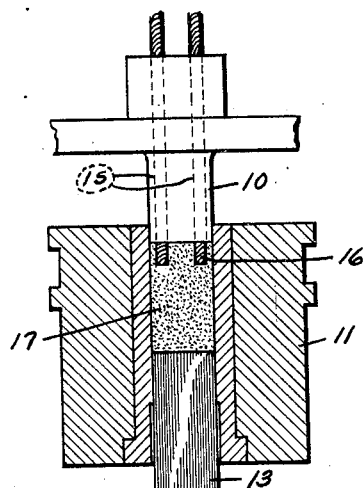
Figure 4:
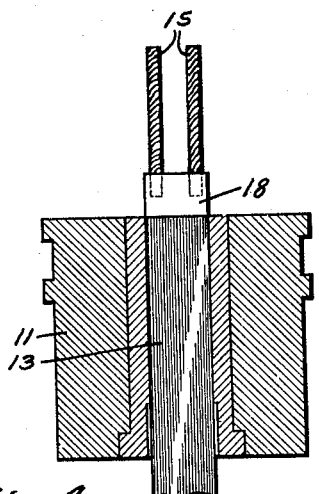

Referring to Figs. 1 to 4 inclusive, 10 designates the reciprocatable forming plunger, 11 the stationary die having the die cavity 12, and 13 the reciprocatable ejecting punch. Plunger 10 has two longitudinal apertures 14 therein within which the two wires, or preferably wire cables, 15 fit quite snugly, but can be projected therethrough by means hereafter described until their lower ends 16 project beyond the plunger end the distance desired to be embedded within the brush to be briquetted. In Fig. 1 die cavity 12 is shown loosely filled with the material 17 which is to be briquetted to form the brush, preferably comprising metallic copper powder and graphite with or without other material. In Fig. 2 plunger 10 has just begun compressing the material 17, the lower projecting ends 16 of the wires having easily embedded themselves within the loose material 17 during the first portion of the compression. In Fig. 3 the plunger 10 is shown at its bottom position after having compressed the powdered material to its finished form 18 which is the desired form of the commutator brush. The wires 15 have been sheared off flush with the top surface of plunger 10 by the sliding knife 20 (herein later described). Knife 20 overlies and backs up the upper ends of wires 15 so that the high compression within the material 18 acting upon the projecting wire ends 16 can have no effect to force wires 15 upwardly within the apertures 14 of the plunger, and hence the wire ends 16 are held in place and embedded within the highly compressed material after having been first inserted within said material while it is in such loose form as not to bend over the wire ends 16. In Fig. 4 the forming plunger 10 has been first raised out of the way leaving the wires 15 fixed to the brush 18 and the ejecting punch 13 has been then forced up by means hereafter described and ejected the brush 18 with its attached wires 15 from the die cavity to the position shown flush with the top surface of die 11. From this position the molded brush is pushed aside by the laterally swinging cavity-filling shoe 21 (see Fig. 6) as it moves over the surface of die 11 to bring its duct 22 into registration with the cavity 12 to refill same for the next molding operation. Punch 13 is returned rapidly to its bottom position while the shoe 21 is swinging into registration with cavity 12 and thus the parts are brought back to position shown in Fig. 1 ready for another cycle.

Figures 5, 6:
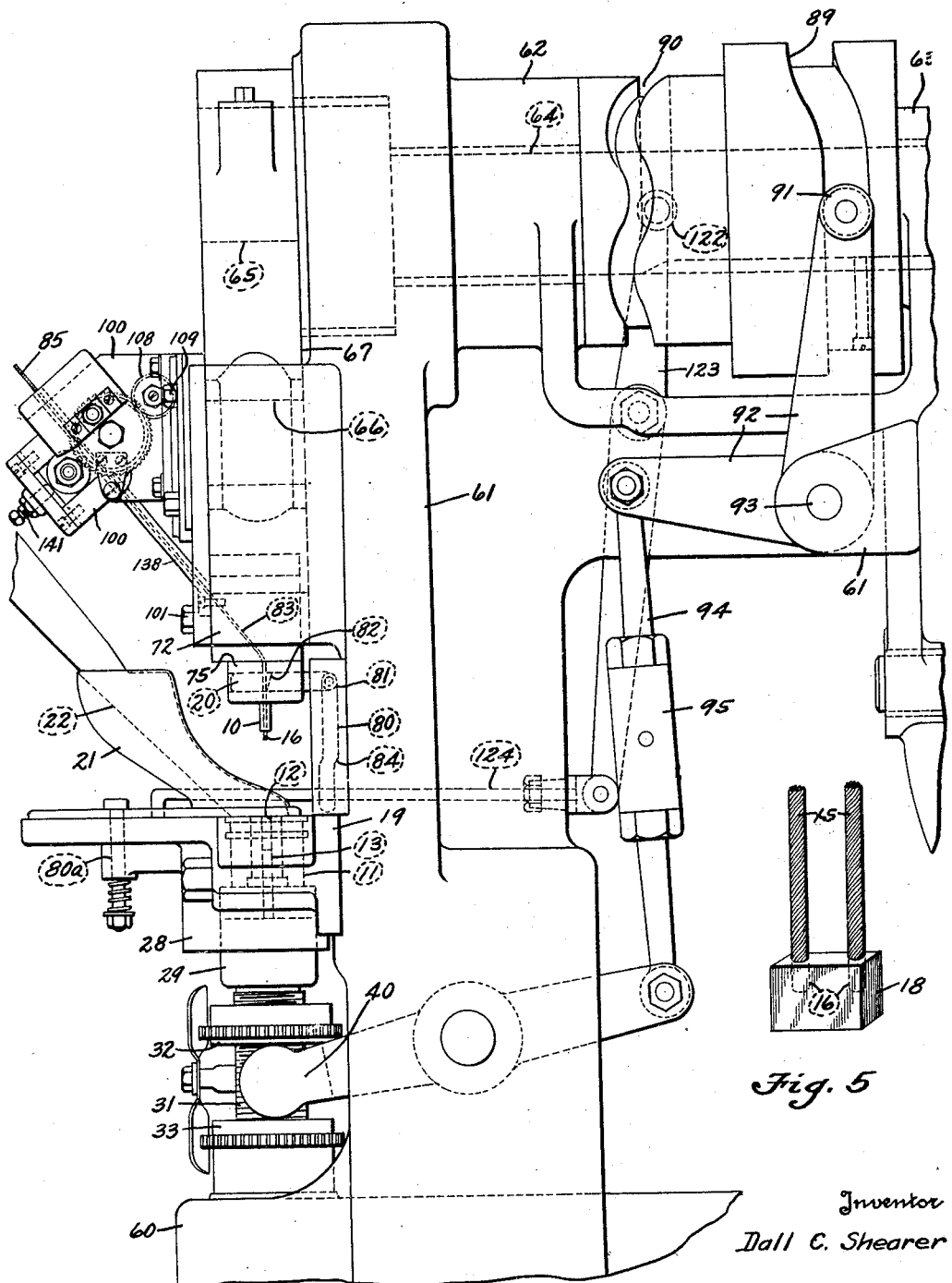
Fig. 5 is a perspective view of the formed brush.
Fig. 6 is a side elevation of the main portion of the briquetting machine.

The fundamental features of the device having now been thus related, one form of mechanism for performing these operations will be described. Referring to Figs. 6 and 7, this machine includes a base 60 which supports a vertically extending frame 61 providing bearings 62 and 63 for a power-driven shaft 64 carrying a crank pin 65. Crank pin 65 is connected with a cross-head pin 66 by means including a connecting rod 67. An adjustable eccentric bushing 68 is interposed between the upper bearing of the connecting rod 67 and crank pin 65 (see Fig. 7) in order to permit adjustment of the throw of crank pin 65. Pin 66 has a bearing within the crosshead 69 which is slidable between the crosshead guides 70 and 71 supported by the main frame 61. The lower end of crosshead 69 has rigidly bolted thereto by bolts 73 a block 72 (see Figs. 7 and 9). A knife head 75 is rigidly fixed to the bottom of block 72 by two screws 76 (see Figs. 7, 8 and 9). The forming plunger 10 is rigidly fixed to the bottom of knife head 75 by two screws 77. It will now be clear that plunger 10 is rigidly fixed to crosshead 69 and is reciprocated by the rotation of the power-driven shaft 64. The shearing knife 20 slides to and fro within the knife head 75, being actuated by a cam roller 81 and a stationary vertical cam slot 80 within a bar fixed to frame 61 (see Fig. 8). When crosshead 69 is in its top position as shown in Fig. 6, knife 20 is moved to the right by the cam roller 81 and cam slot 80. In this position the two wire apertures 82 in knife 20 are aligned with the corresponding apertures 14 in plunger 10 and also with the two wire apertures 83 leading angularly upward through block 72.

During the up movement of crosshead 69, the two long wires 85 are fed down by means hereinafter described through the two holes 83, thence down through the two holes 82 in knife 20, thence down through the two holes 14 in the forming plunger 10, until the lower ends 16 of wires 85 extend below the lower end of plunger 10 the distance desired to be embedded within the molded brush. With the wires in this position, the crosshead 69 descends, carrying the wires and the entire wire feeding mechanism down with it and also of course the knife 20 and plunger 10. Plunger 10 enters die cavity 12 as described above, the wire ends 16 embedding themselves easily in the loose powder material with which cavity 12 has been filled. When cam roller 81 reaches the cam portion 84 during its down movement, the knife 20 is moved suddenly to the left (as seen in Fig. 8) causing it to shear off the two short wire lengths 15 upon wires 85 and, after so doing, knife 20 remains in position over the upper ends of wires 15 for the remainder of the pressure stroke, thereby preventing wires 15 from being forced up through holes 14 in plunger 10 by the high pressure within the material 17 being molded. The wire ends 16 are therefore firmly embedded within the completely formed brush 18 which is shown in Figs. 8 and 9. Plunger 10 is immediately withdrawn from the die cavity 12, but the formed brush 18 is held in place by its pressure upon the cavity walls and brush 18 in turn pulls the short wires 15 from their snugly fitting holes 14 in plunger 10 when said plunger moves up. As soon as sufficient clearance occurs, the brush 18 is ejected from the die cavity by the ejecting punch 13 which is forced up by its actuating lever 40 whose bifurcated end engages the cam faces of the large nuts 32 and 33 adjustably fixed upon the large threaded shank 31. The lower end of punch 13 is rigidly fixed to the head 29 integral with the threaded shank 31. Head 29 is suitably guided in its up movement by the stationary guide bearing 28 depending from the die table 19. The lever 40 is actuated by a cam groove 89 on the power-driven shaft 64 which receives a cam roller 91 attached to a bell-crank lever 92 which is pivoted at 93 upon a portion of the main frame 61. Levers 92 and 40 are connected by a link 94 including a turnbuckle 95 to permit the proper adjustment of the bifurcated end of lever 40 with respect to the cam surfaces of the two cam nuts 32 and 33.

The powder material is introduced into the molding cavity 12 through the duct 22 in the shoe 21 which is supported upon the smooth top surface of die table 19 and pivots about the pin 80a. Shoe 21 is swung about pivot 80a to bring duct 22 into registration with die cavity 12 at the proper time for filling same and is then swung laterally away to clear the path of the plunger 10 upon its descent. Shoe 21 is actuated by a cam groove 90 upon the power driven shaft 64, a cooperating lever 123 having a cam roller 122 riding within groove 90 and having a fixed pivot at 121 on the main frame 61, and a link 124, in such a manner that the lower end of the powder duct 22 will be brought into registration with die cavity 12 and then the entire shoe 21 will be given several lateral shakes by the shape of the cam groove 90 in order to insure that the powder will not clog in the delivering ducts and will fill die cavity 12 level full as shown in Fig. 1. Then shoe 21 is swung about pivot pin 80a to clear the path of the plunger 10 as stated above. During the swinging movement of shoe 21 into registration with cavity 12, the side surface thereof will engage the previously molded brush 18 when in its ejected position shown in Fig. 4 and shove it laterally across the top of die table 19 into a suitably located receptacle.

Referring now to Figs. 10, 11 and 12, the wire feeding mechanism will now be described. A bracket 100 is rigidly fixed to the reciprocating crosshead 69 by the four screws 101. A horizontal shaft 102 is mounted in bearing 103 in bracket 100 (see Fig. 12) and has keyed to the left end thereof a gear 104 and a plain-faced wire feed-roll 105. Shaft 102 supports at its right hand a gear 106 loose upon said shaft, and a rocket wheel 107 keyed to said shaft. Gear 106 meshes with a rack pinion 108 (see Fig. 10) which in turn meshes with a stationary rack 110 which is fixed to a stationary part of the machine by two bolts 109. When bracket 100 and its entire supported mechanism reciprocates up and down with the crosshead 69, pinion 108 rides upon rack 110 and so causes gear 106 to rotate loosely upon shaft 102 first in one direction and then the other. Gear 106 has fixed thereto a pawl bracket 111 (see Figs. 10 and 11) upon which the spring pressed pawl 112 is pivotally supported so that it cooperates with ratchet wheel 107. It will now be clear that when crosshead 69 is on its up-stroke, pinion 108 will be rotated by rack 110 in the direction of the arrow in Fig. 10, loose gear 106 together with its supported pawl 112 will also be rotated, and hence the ratchet wheel 107 and shaft 102 together with the gear 104 and feed roll 105 will all be rotated in the directions shown by the arrows in Figs. 10 and 12. On the down-stroke of crosshead 69 pinion 108 and loose gear 106 will be rotated in the reverse direction, but the spring pressed pawl 112 will merely slide over the teeth of ratchet wheel 107 which will be held stationary by a friction device 115 (see Figs. 10 and 12). The friction device comprises a friction rubbing block 116 held forced against the ratchet wheel 107 by coil spring 117 which may have its compression adjusted by the screw plug 118 and give the desired holding power without excessive friction upon wheel 107.

When pawl 112 is rotated clockwise (as seen in Fig. 10) it will ride up upon a non-rotating cam 120 after about a quarter of a revolution and thereafter be lifted from contact with its ratchet 107. Upon counter-clockwise rotation of pawl 112 it will at first merely slide upon cam 120 until it slides off the tip thereof, after which it engages and rotates the ratchet 107. Cam 120 has an arcuate adjustment upon its supporting bracket 119 indicated by the three arcuate slots 121 and their cooperating screws, and by this adjusting means the angle through which ratchet 107 is turned during each up-stroke of crosshead 69 may be simply adjusted.

Gear 104 fixed to shaft 102 at its left end (as seen in Fig. 12) meshes with a gear 125 keyed to a jack shaft 126 which is supported in bearing 127 mounted within a bearing block 140 which is slidably mounted upon a portion of bracket 100 (see Fig. 10). Bearing block 140 may be forced inwardly toward shaft 102 by screwing up on screw 141 against the urge of the coil compression spring 142 which is seated within a suitable recess in bracket 100 and bears directly against bearing block 140 tending to force block 140 and its supported shaft 126 away from shaft 102. The grooved feed roll 130, which cooperates with the plain feed roll 105, is keyed to shaft 126 and is rotated thereby through gears 104 and 125. Roll 130 has two peripheral grooves 131 which receive the two wires 85 as they pass between the cooperating rolls 105 and 130 whereby the proper amount of driving friction between the wires and feed rolls is obtained. This driving friction may be adjusted as desired by adjusting screw 141 which moves shaft 126 and the grooved feed roll 130 relative to roll 105. The two wires 85 pass down to the feed rolls through parallel guiding holes 135 in the guide block 136 fixed to a portion of bracket 100 (see Figs. 10 and 11). From feed rolls 105 and 130 the wires 85 pass down through the two parallel holes 137 in the conduit 138 and thence into the aligned holes 83 in block 72 previously described (see Fig. 8). It will now be clear that upon each up-stroke of crosshead 69 the two wires 85 will be fed down by the feed rolls 105 and 130 a predetermined distance, which distance may be adjusted as desired by the setting of the cam 120 which governs the action of the ratchet pawl 112, as described above. This distance of feed is adjusted to equal the short wire lengths 15 which are cut off by knife 20. Hence after each molding operation as soon as knife 20 is returned to its normal position by the cam slot 80 during the up-stroke, the two wires 85 are fed down through the aligned holes 83, 82 and 14 until their lower ends 16 again project below the lower end of plunger 10 the desired distance, as heretofore described.

When knife 20 moves to the left as seen in Fig. 8 to shear off the wire lengths 15, the lower ends of the long wires are slightly bent in the apertures 82, which are slotted out for the purpose as clearly shown. However, when knife 20 returns to its normal position the straight sides of slots 82 again straighten the bent wire ends to align said ends perfectly with the holes in plunger 10 so that there can be no ledge or shoulder which can obstruct the proper down-movement of the wires 85. It is to be understood that the "wires 85" as herein termed, are not ordinarily single strands, but are preferably quite flexible multiple strand cables, such as are commonly used for the flexible connectors on commutator brushes.

It is obvious that, if desired, the mechanism herein illustrated and described may be easily modified to mold a brush with only one flexible connector embedded therein instead of two.

While the form of embodiment of the present invention as herein disclosed, constitutes a preferred form, it is to be understood that other forms might be adopted, all coming within the scope of the claims which follow.

What is claimed is as follows.

1. A molding machine for forming commutator brushes and the like having a wire connector imbedded therein, comprising: a die having a die cavity therein open at both ends, an ejecting punch extending within and closing one end of said cavity, means for filling said cavity with moldable material, a reciprocating plunger having an aperture therethrough, means for feeding the end of a long wire through said aperture so that the wire end projects beyond the plunger end, said plunger and projecting wire being operable to project together within the other open end of said cavity to compress and mold the material therein whereby the projecting wire end is embedded within the molded brush, means for severing the wire while in said aperture and means for moving the ejecting punch to eject the molded brush and embedded wire together from the die cavity.

2. A molding machine for forming commutator brushes and the like having a wire connector imbedded therein, comprising: a die having a cavity, a forming plunger movable into said cavity and having an aperture therethrough, means for feeding a wire through said aperture and projecting beyond the plunger end, means for severing said wire after being so fed into said aperture, and means for forcing said plunger and projecting wire into said cavity to mold material therein and cause the projecting portion of said wire to be imbedded within the molded material.

3. A molding machine for forming commutator brushes and the like having a wire connector imbedded therein, comprising: a die having a die cavity therein open at both ends, an ejecting punch extending within and closing one end of said cavity, means for filling said cavity with moldable material, a reciprocating plunger having a longitudinal aperture therethrough, means for feeding a wire into said aperture until the wire projects beyond the plunger end, means for forcing said plunger and projecting wire into said cavity to mold material therein under high pressure and cause said wire to be partially embedded within the molded material, means for severing said wire and backing up the severed wire end prior to high pressure exerted by said plunger, and means for moving the ejecting punch to eject the molded article and embedded wire as a unit.

4. In a machine of the character described, in combination, a die having a cavity, a reciprocating forming plunger movable into and out of said cavity and having a longitudinal aperture therein, means for intermittently feeding one end of a wire through said aperture until the wire end projects beyond the plunger end, means for cutting off a suitable length of said wire while within said aperture and backing up the severed end thereof, and means for forcing said plunger and projecting wire into said cavity to mold material therein and cause the projecting end of said wire to be embedded within the molded material.

5. In a machine of the character described, in combination, a die having a cavity, a reciprocating forming plunger movable into and out of said cavity and having a longitudinal aperture therein, means for intermittently feeding one end of a wire through said aperture until the wire end projects beyond the plunger end when said forming plunger is on its out stroke, means for cutting off a suitable length of said wire while within said aperture and backing up the severed end thereof, and means for forcing said plunger and projecting wire into said cavity to mold material therein and cause the projecting end of said wire to be embedded within the molded material.

6. In a machine of the character described, in combination, a die having a cavity, a reciprocating forming plunger movable into and out of said cavity and having a longitudinal aperture therein, means for intermittently feeding one end of a wire through said aperture until the wire end projects beyond the plunger end when said forming plunger is on its out stroke, means for cutting off a suitable length of said wire while within said aperture and backing up the severed end thereof when said plunger is on its in stroke, and means for forcing said plunger and projecting wire into said cavity to mold material therein and cause the projecting end of said wire to be embedded within the molded material.

7. In a briquetting machine of the character described, in combination, a die having a cavity, means for filling said cavity loosely with briquettable material, a reciprocating forming plunger movable into and out of said cavity and having a longitudinal aperture therein, means for intermittently feeding one end of a wire through said aperture until the wire end projects beyond the plunger end, means for cutting off a suitable length of said wire while within said aperture and backing up the severed end thereof, and means for forcing said plunger and projecting wire into said cavity to briquette the material therein and cause the projecting end of said wire to be embedded within the formed briquette.

In testimony whereof I hereto affix my signature.

DALL C. SHEARER.